United States Patent [19]

Goodloe et al.

[11] Patent Number: 4,516,230
[45] Date of Patent: May 7, 1985

[54] PROTECTIVE DRIVE-LEVEL LIMITER FOR AN ELECTRO-HYDRAULIC VIBRATOR

[75] Inventors: Kent J. Goodloe; Ralph A. Landrum, Jr., both of Houston, Tex.

[73] Assignee: Western Geophysical Company of America, Houston, Tex.

[21] Appl. No.: 508,232

[22] Filed: Aug. 5, 1983

Related U.S. Application Data

[63] Continuation of Ser. No. 255,205, Apr. 17, 1981, abandoned.

[51] Int. Cl.³ .......................... G01V 1/04; G01V 1/14; G01V 1/16
[52] U.S. Cl. .................... 367/190; 181/119; 181/401; 73/664
[58] Field of Search ............... 367/190; 181/119, 121, 181/401; 73/664

[56] References Cited

U.S. PATENT DOCUMENTS

| 3,572,089 | 3/1971 | Cligsman | 73/664 |
| 4,049,077 | 9/1977 | Mifsud | 181/401 |
| 4,063,613 | 12/1977 | Silverman | 181/119 |
| 4,297,888 | 11/1981 | Hirai et al. | 73/664 |

OTHER PUBLICATIONS

"MB Hydraulic Vibration Exciter and Force Generator System", 1960, 6 pgs., Bull. 1000 5M, 3-60.

Primary Examiner—Nelson Moskowitz
Attorney, Agent, or Firm—William A. Knox

[57] ABSTRACT

In accordance with an embodiment of this invention, voltages are received from the pilot valve torque motor, the main servo valve and the actuator indicating the value of the torque motor current, spool position and actuator displacement. The received voltages are compared to a preselected threshold value. When one or more of the voltages exceed a threshold value, an attenuator control voltage is generated. An attenuator circuit is coupled between the reference driver signal generator and the DC servo amplifier. The attenuator control voltage, if present, is applied to the attenuator circuit and scales down the reference driver signal as a function of the error signal level thereby to limit the torque motor current and consequently the displacements of the main servo valve spool and actuator shaft.

5 Claims, 2 Drawing Figures

PROTECTIVE DRIVE-LEVEL LIMITER FOR AN ELECTRO-HYDRAULIC VIBRATOR

This application is a continuation of application Ser. No. 255,205, filed 04/17/81, now abandoned.

BACKGROUND OF THE INVENTION

1. Field of the Invention

This invention is concerned with electrically-controlled hydraulic chirp-signal vibrators as used in seismic exploration. More specifically, this invention is concerned with automatically limiting the drive level of the vibrator to prevent electrical and/or mechanical damage to some of the components.

2. Discussion of the Prior Art

Typical servo-controlled hydraulic vibrators used to generate chirp signals for use in seismic exploration consist of a ground-contacting base plate to which is attached a vertical linear actuator shaft. A portion of the shaft is upset to form a piston. A reaction mass has a bore therethrough to receive the actuator shaft. A portion of the bore includes an enlarged cylindrical portion that forms an actuating chamber within which is fitted the piston of the linear actuator shaft. A port is provided at the upper and lower ends of the actuating chamber. A main servo valve provides pressurized hydraulic fluid through the upper or the lower port to apply hydraulic pressure alternately to opposite sides of the actuator piston thereby to shake the attached base plate with respect to the reaction mass.

A reference driver signal, through a DC servo amplifier drives the torque motor of a pilot servo valve. The pilot servo valve in turn drives the main servo valve to cause the actuator to shake the base plate in accordance with the desired chirp signal. A typical chirp signal might include a swept-frequency spectrum of 5 to 100 Hz. A manual drive-level adjustment is provided to adapt the vibrator to changing environmental conditions and variations in ground impedance.

It is known that it is preferable to maintain the output signal of the actuator in constant phase relation with the input driver signal. A feedback arrangement is provided to sense the output signal of the actuator and to multiply that signal by the driver signal and integrate the result to determine any change in phase between the two. A small phase change generates an error signal which, after integration is used to phase-shift the driver signal to restore the correct phase to the actuator output signal. See for example, U.S. Pat. No 3,219,971 to Cole which is incorporated herein by reference as a teaching of known art.

Feedback loops are provided between the actuator shaft and the main servo valve and the servo amplifier which provides the torque motor drive signal. The feedback loops stabilize operation of the servomechanical system.

The feedback signal from the main servo valve (valve feedback) and from the actuator (mass feedback) are often derived from linear variable differential transformers (LVDT). The input shafts of the LVDTs are coupled respectively to the main servo spool and the actuator shaft. The LVDTs sense the displacements and displacement directions of the servo spool and actuator shaft, the displacements being a function of the volume of fluid flow. The feedback voltages are fed through suitable demodulating amplifiers and thence to the DC servo amplifier. Manual adjustments may be provided in the feedback loops for stability adjustments. See for example, U.S. Pat. No. 3,881,167 to Pelton et al. and U.S. Pat. No. 4,184,144 to Rickenbacker, both of which are incorporated herein by reference. The drive level of the vibrator, that is, the force applied to the ground is typically manually adjusted by the operator.

We have found that for all practical purposes a vibrator is a band-limited signal generator. That is, at frequencies outside of a designated band, the vibrator is inherently incapable of generating a signal having an acceptable output level without damaging the component parts.

At very low frequencies, the actuator is stroke limited. Any attempt to increase the drive level results in an excessive displacement of the actuator shaft such that the piston strikes the upper and lower extremities of the actuator chamber, creating severe damage.

At very high frequencies the vibrator system is acceleration limited. The main servo valve cannot track the pilot valve signal because of the inertia of the main servo valve spool. As a result, the output signal level of the vibrator drops off. Again, an attempt to increase the drive level results in application of excessive current to the torque motor. The excessive current burns out the torque motor windings.

At low and intermediate frequencies, if the manual drive level adjustment is set too high, the spool of the servo valve hits the end stops. Severe valve damage occurs to the servo valve.

Thus, we have found that the manual drive-level adjustment is critically dependent upon the skill of the operator. If he sets the level too high, severe mechanical damage may result. Further, the drive level limit is sensitive to earth impedance. Changing conditions, as the vibrator moves from station to station may require frequent readjustments of the drive level which are sometimes overlooked by an unwary operator.

SUMMARY OF THE INVENTION

It is the purpose of this invention to provide an automatic protective drive-level limiter feedback loop, in addition to the conventional servo feedback loops, to limit the torque motor current of the pilot valve to a safe value and to limit excursions of the main servo valve spool and the actuator shaft to prevent damage thereto. The drive-level limiter feedback loop has a higher priority level than the conventional servo-mechanical feedback networks. The protective feedback loop may be placed in series with the manual drive level adjustment but preferably replaces the manual adjustment.

In accordance with an embodiment of this invention, voltages are received from the pilot valve torque motor, the main servo valve and the actuator indicating the value of the torque motor current, spool position and actuator displacement. The received voltages are compared to a preselected threshold value. When one or more of the voltages approaches a threshold value, an attenuator control voltage is generated. An attenuator circuit is coupled between the reference driver signal generator and the DC servo amplifier. The attenuator control voltage, if present, is applied to the attenuator circuit and scales down the reference driver signal as a function of the error signal level thereby to limit the torque motor current and consequently the displacements of the main servo valve spool and actuator shaft.

In another aspect of a preferred embodiment, an audio-visual alarm alerts the operator to the fact that the limiter feedback loop has assumed system control.

DETAILED DESCRIPTION OF A PREFERRED EMBODIMENT

Figure 1:
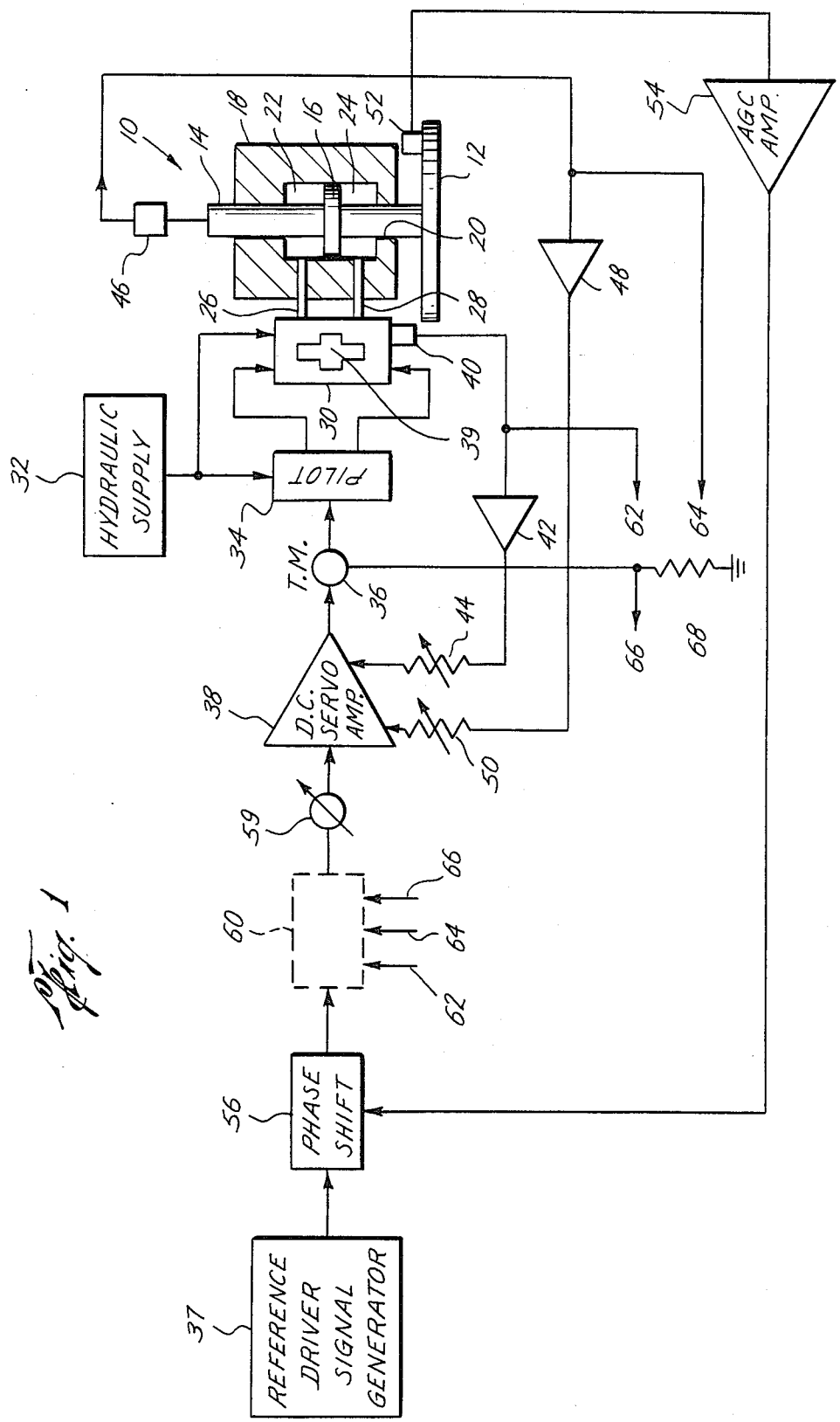
FIG. 1 is a simplified schematic circuit diagram of the feedback signal paths involved in an electro-hydraulic vibrator system employing the protective drive-level limiter of this invention.

Referring to FIG. 1, there is shown schematically an electromechanical servo mechanism for controlling a vibrator such as 10. The circuitry shown in FIG. 1 is of conventional design and is greatly simplified. The prior-art servo loops are shown in order to more clearly illustrate how this invention interacts with a known vibrator servomechanism.

Vibrator 10 consists essentially of a ground-contacting base plate 12 to which is secured a linear actuator shaft 14. Actuator shaft 14 includes an upset that forms a piston 16. A reaction mass 18 has a bore 20 therethrough for receiving actuator shaft 14. A portion of bore 20 is enlarged to form a cavity for receiving piston 16 which divides the cavity into an upper chamber 22 and a lower chamber 24. Fluid ports 26 and 28 respectively fluidly communicate with upper and lower chambers 22 and 24.

A main servo valve 30, in fluid communication with ports 26 and 28, admits hydraulic fluid alternately into upper and lower chambers 22 and 24 from a source of pressurized hydraulic fluid 32. Action of main servo valve 30 is controlled by pilot valve 34 that operates in response to torque motor 36 which in turn is driven by a reference driver signal from signal generator 37 through DC servo amplifier 38.

Displacements of the spool 39 in main servo valve 30 are sensed by an LVDT 40. The output signal of LVDT 40 is demodulated and is fed back to DC servo amplifier 38 via a servo valve amplifier 42 and servo feedback adjustment potentiometer 44. Similarly, excursions of actuator shaft 14 are sensed by LVDT 46 whose output signal is fed back to servo amplifier 38 via amplifier 48 and potentiometer 50. Servo feedback adjustment potentiometers 44 and 50 adjust the gain of the servo feedback loops to insure stability of the circuits in a manner well known to the art.

As discussed earlier, it is desirable that there be a constant phase difference between the output signal of baseplate 12 and the reference driver signal. An accelerometer 52 is mounted on base plate 12. The output of accelerometer 52 is sent through an AGC amplifier 54 to a phase detection and phase shifter network 56. Here the output signals of the baseplate are compared with the reference driver signal. Necessary phase corrections are introduced to the system at the input to DC servo amplifier 38.

A manual drive-level adjustment potentiometer 59 may be used by the operator to adjust the level of the input reference driver signal in order to optimize the acoustic output of vibrator 10. The allowable input signal level is related to the ground impedance, the mechanical restraints of the overall system and other factors. Correct adjustment is critically dependent on operator judgement as previously discussed.

The above discussion constitutes a brief summary of the essential functions of known vibrator servomechanisms. Those systems are more fully described in the references cited above which have been incorporated herein by reference.

In this invention we seek to minimize possible operator judgement idiosyncracies by augmenting manual drive level control 59 with an automatic protective drive level limiting network 60 shown by the dashed box 60 in FIG. 1. Protective network 60 senses the maximum allowable limits for torque-motor current, servo-valve spool displacement and actuator-shaft excursions. When one or more overdrive conditions occur, the protective network attenuates the level of the reference driver signal to an acceptable value. Normal functioning of the servo feedback loops remains unaffected.

Figure 2:
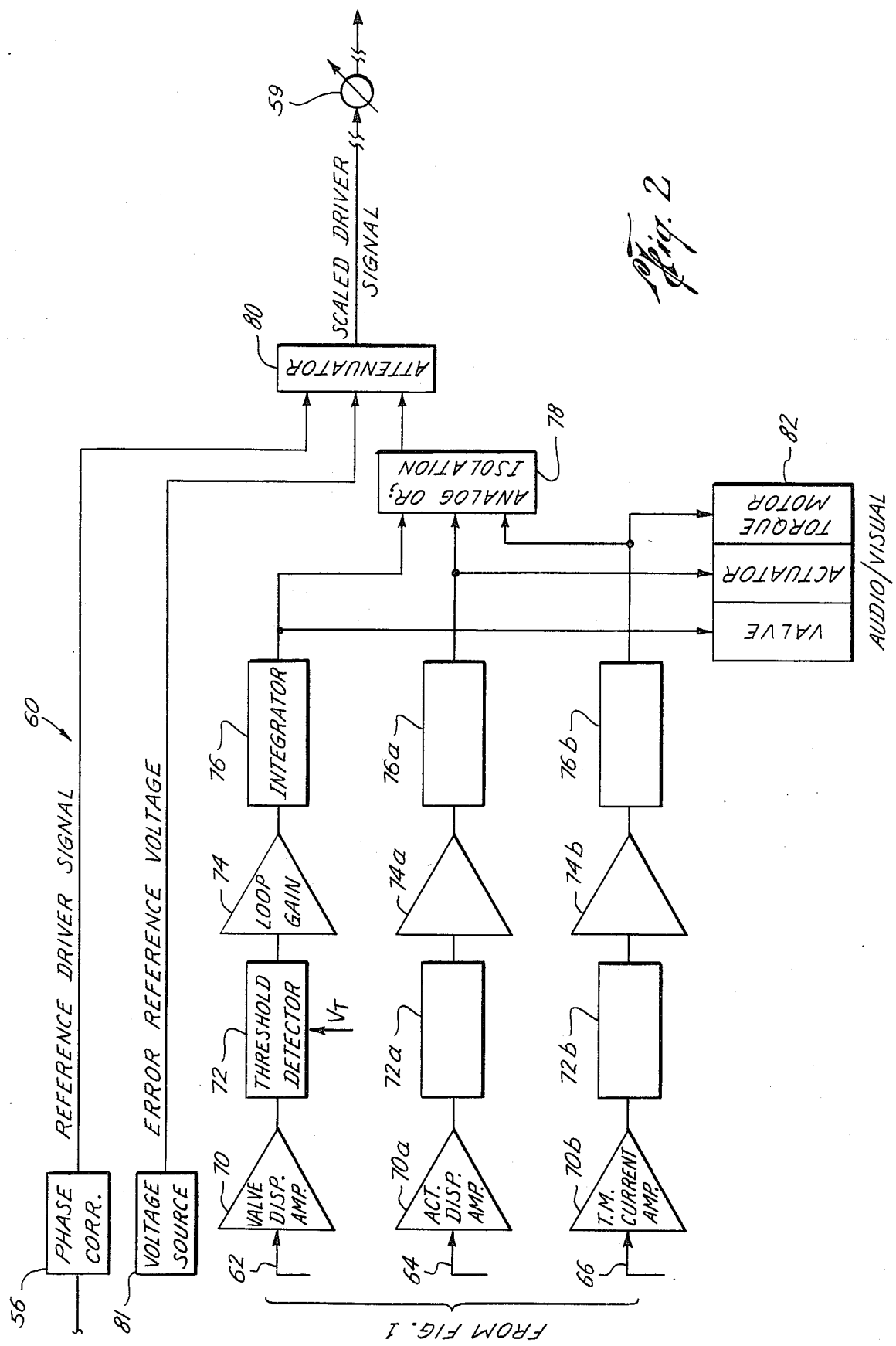
FIG. 2 is a detailed block diagram of the drive level limiter network.

Details of protective network 60 are shown in FIG. 2. There are three feedback input circuits: Valve displacement input 62 which receives the output signal from LVDT 40; actuator excursion circuit 64 which receives its input signal from LVDT 46; and a voltage input 66 that is developed across resistor 68 due to the torque motor current. The feedback inputs are received respectively by valve displacement normalizing amplifier 70, actuator excursion normalizing amplifier 70a and torque-motor-current normalizing amplifier 70b. Threshold detectors 72, 72a, and 72b coupled to the normalizing amplifiers, rectify the normalized signals and decide whether the outputs of the corresponding amplifiers exceed a selected threshold voltage. If one or more signals exceeds its corresponding selected threshold, an overdrive condition is indicated by an error signal from the threshold detector. The respective error signals are gain-conditioned in loop gain amplifiers 74, 74a, 74b and are routed through conventional RC integrator or filter circuits 76, 76a, 76b to smooth out and filter the wave form of the error signal. An analog OR circuit 78 receives one or more of the three error signals and applies the largest of the error signals to analog attenuator 80. Isolator circuits associated with OR circuit 78, such as suitable diodes, prevent feedback of an error signal from one line into another line. The level of the error signal applied to attenuator 80 is a function of the required reduction of drive signal required to eliminate the attempted over-drive condition which function may be in inverse proportion to the error signal level.

Attenuator 80 has as its inputs, the full scale reference driver signal from phase shifter 56, the error signal from OR circuit 78 which is internally subtracted from an error reference voltage from voltage source 81 to form a multiplier voltage. The multiplier voltage is then multiplied by the reference driver signal to scale that voltage proportionately downwards. The output of the attenuator is of course, a scaled reference driver voltage that is applied to DC servo amplifier 38.

In one embodiment of this invention an audio/visual alarm system 82 may be provided for each of the error-signal lines. The alarm indicates to the operator that an overdrive condition exists and that the protective drive-level limiter has assumed control. Presence of the alarm also provides the operator with a reference for manually setting the servo and actuator feedback adjustments to appropriate levels.

The best mode of operation may be better understood by way of a numerical example.

The torque motor 36 driving pilot valve 34 is current driven. The maximum safe current is 40 milliamperes (mA). Resistor 68 has a value such that the voltage thereacross is 0.4 volt (V) with a current flow of 40 mA.

The maximum displacement of valve spool 39 in servo valve 30 is 0.13 inch. By design preference, we prefer to hold the displacement to 0.10 inch. LVDT 40, which is directly connected to valve spool 39, provides an output voltage, in this example at least, of 0.4 v when displaced by 0.10 inch. As is well known, the output of an LVDT is an amplitude-modulated AC carrier whose amplitude is proportional to displacement, the phase shift being a function of the displacement direction. The LVDT outputs are, of course, rectified in protective drive-limiting network 60 by means well known to the art.

The maximum displacement of linear actuator shaft 14 may be as much as 2.5 inches but we prefer to hold the displacement limit to 1.0 inch. LVDT 46, in the exemplary design, provides an output voltage level of 1.0 V for a 1-inch displacement of shaft 14.

The signals as described are fed to protective drive limiting network 60 over lines 62, 64, 66 to the previously mentioned normalizing amplifiers of any well known type such as the HA-4741-2 operational amplifier made by Harris Semiconductors of Melbourne, Fla. A fixed threshold voltage $V_T = 5.1V$ is used as a reference in threshold detectors 72, 72a, 72b. Therefore the respective normalizing amplifiers 70, 70a, 70b are assigned gain values to provide normalized voltages. For example, the gain of amplifier 70a would be 5.1 to boost the signal representing maximum actuator travel from 1 volt to the threshold of 5.1 V. Similarly normalizing amplifier 70 would have a gain of about 12.75 to boost the 0.4-volt maximum displacement signal to the 5.1 volt threshold.

Any normalized electrical signals that exceed 5.1 V are defined as error signals and the error signals, if any, are integrated in an integrator (filter) such as 76. The error signal is defined as the difference between the normalized electrical signal and the threshold voltage. The time constant in our preferred embodiment is about 2 seconds. The integrator has a relatively fast attack time because it is urgent to eliminate an over-limit drive condition, but a relatively long, i.e. 2 seconds, release time.

From the integrators, the integrated error signals pass to an analog OR gate 78 of any well-known design. Here the maximum integrated error signal is selected to scale the reference driver signal in attenuator 80.

Attenuator 80 is a precision analog multiplier such as the AD 534 integrated circuit made by Analog Devices of Norwood, Mass. The selected integrated error signal from OR gate 78 is input to attenuator 80. A precision reference voltage such as 10 V provides a second input. The error signal is combined with the reference voltage with opposite sign and the combined signal is applied to a $\div 10$ circuit that is an inherent component of the preferred multiplier chip. Thus, if for example, the level of the selected integrated error signal turned out to be 2.5 V, the multiplier voltage would be 0.75 after passing through the $\div 10$ circuit. The input reference driver signal, which normally is 5 V peak full scale, is multiplied by the multipler voltage to yield a scaled driver signal which in this example would be reduced by 25%.

The numerical values and specific components recited above are exemplary only and in no way limit the scope of this invention. For example, an accelerometer could be used in place of LVDT 46. The output of the accelerometer could be doubly integrated to provide a measure of displacement. The placement of certain components could be rearranged. For example, the protective drive limiting network 60 could be placed ahead of the phase correction circuitry 56. The outputs of the servo amplifier 42 and actuator amplifier 48 could be used as inputs to protective drive-limiting network 60 in place of the raw LVDT output signals. Our invention is limited by the appended claims wherein

We claim as our invention:

1. An automatic protective drive-level limiting network for use with a seismic vibrator of the type having a ground contacting base plate coupled to a hydraulically-driven linear actuator that is controlled by an electrohydraulic servo mechanism consisting of at least a main servo valve having a valve spool, coupled in series with a pilot valve controlled by an electrical current-driven torque motor that is responsive to an input reference driver signal, said actuator and said valve spool having mechanical displacement limits, comprising:

means for generating first and second error signals when said valve spool and said actuator approach their respective mechanical displacement limits within a predetermined clearance;

means for monitoring the current flow through said torque motor;

means coupled to said monitoring means for generating a third error signal when said current flow in said torque motor exceeds a preselected upper limit; and means coupled to said error signal generating means for attenuating said input reference driver signal as a function of the larger of said first, second, and third error signals.

2. An automatic protective drive-level limiting circuit for use with a seismic vibrator having a ground-contacting base plate that is reciprocatingly driven by a hydraulic linear actuator that is controlled by an electro-hydraulic servo device consisting of at least a main servo valve, having a valve spool, coupled in series with a pilot valve that is controlled by a current-actuated torque motor in response to a driver signal, having a preselected level, provided by a driver signal generator, said linear actuator and said valve spool having mechanical displacement limits, comprising:

first means for generating a first signal having a level proportional to the displacement of said linear actuator;

second means for generating a second signal having a level proportional to the displacement of said valve spool;

third means for generating a third signal having a level proportional to the current flow through said torque motor;

means for comparing said first, second and third signal levels with a threshold signal level to define first, second and third error signals;

means for selecting the largest one of said first, second and third error signals; and means for scaling said driver signal by an amount sufficient to reduce said largest error signal level to zero.

3. The automatic protective drive-level limiting circuit as defined by claim 2, wherein said first, second and third signal generating means each comprises:

gain-conditioning means for normalizing the levels of said first, second and third signals respectively to a common reference level.

4. The automatic protective drive-level limiting circuit as defined by claim 3, wherein said comparing means comprises:
threshold-detecting means, coupled to said gain-conditioning means, for determining, as an error signal, the excess of any one of said first second and third signal levels over a limiting safe value for any one of the parameters of spool displacement, actuator displacement and torque-motor current flow; and
integrating means, coupled to said threshold-detecting means, for filtering each said error signal with respect to time, said integrating means having a short attack time constant and a longer release time constant.

5. The automatic protective drive-level limiting circuit as defined in claim 4, wherein the scaling means comprises:
attenuating means, interconnected between said driver-signal generator and said torque motor, and further coupled to said error-signal selecting means, which in turn is coupled to said integrating means, for reducing the driver signal level as an inverse function of said largest error signal.

* * * * *